United States Patent
Beutler

(10) Patent No.: US 9,173,350 B1
(45) Date of Patent: Nov. 3, 2015

(54) LAWN AND GARDEN EDGING

(71) Applicant: Jeffery M. Beutler, Belmont, MI (US)

(72) Inventor: Jeffery M. Beutler, Belmont, MI (US)

(*) Notice: Subject to any disclaimer, the term of this patent is extended or adjusted under 35 U.S.C. 154(b) by 0 days.

(21) Appl. No.: 14/033,897

(22) Filed: Sep. 23, 2013

Related U.S. Application Data

(60) Provisional application No. 61/703,839, filed on Sep. 21, 2012.

(51) Int. Cl.
- E02D 27/00 (2006.01)
- A01G 1/08 (2006.01)
- E04H 17/06 (2006.01)

(52) U.S. Cl.
CPC ............. A01G 1/08 (2013.01); E04H 17/063 (2013.01)

(58) Field of Classification Search
CPC .... A01G 1/08; A01G 13/0281; E04H 17/063; E01C 5/226
USPC ............................ 47/33; 404/7, 8, 34; 52/102
See application file for complete search history.

(56) References Cited

U.S. PATENT DOCUMENTS

| | | | | |
|---|---|---|---|---|
| 68,971 | A * | 9/1867 | Fancher | 404/7 |
| 560,949 | A * | 5/1896 | Thomas | 72/223 |
| 1,527,684 | A * | 2/1925 | Hull | 52/574 |
| 1,813,055 | A * | 7/1931 | Kannen | 47/33 |
| 3,415,013 | A * | 12/1968 | Galbraith | 47/73 |
| 3,545,127 | A * | 12/1970 | Jensen | 47/33 |
| 3,945,747 | A * | 3/1976 | Cruz | 404/7 |
| 4,074,479 | A * | 2/1978 | Krupka | 52/102 |
| 4,659,247 | A * | 4/1987 | Steiner | 404/8 |
| 4,823,521 | A * | 4/1989 | Kontz, Jr. | 52/102 |
| 4,934,093 | A * | 6/1990 | Yanna | 47/33 |
| 5,070,642 | A * | 12/1991 | Albrecht | 47/32.7 |
| 5,119,587 | A * | 6/1992 | Waltz | 47/33 |
| 5,133,163 | A * | 7/1992 | Christensen et al. | 52/102 |
| 5,134,817 | A | 8/1992 | Richardt | |
| 5,259,154 | A * | 11/1993 | Lilley | 47/33 |
| 5,377,447 | A | 1/1995 | Fritch | |
| 5,588,262 | A * | 12/1996 | Dawson | 52/102 |
| 5,771,631 | A * | 6/1998 | Dawson | 47/33 |
| 5,826,372 | A * | 10/1998 | Parsons | 47/33 |
| 6,226,934 | B1 * | 5/2001 | Gaston | 52/102 |
| 6,324,782 | B1 * | 12/2001 | Gaston | 47/33 |
| 6,385,898 | B1 | 5/2002 | Noel | |
| 6,502,349 | B1 * | 1/2003 | Richet et al. | 47/33 |
| 6,594,959 | B2 | 7/2003 | Whitson | |
| 6,668,484 | B2 | 12/2003 | Riccobene | |
| 6,925,753 | B1 * | 8/2005 | Mallory | 47/33 |
| D571,487 | S * | 6/2008 | Jarrett | D25/164 |
| 8,127,490 | B2 | 3/2012 | Perotti | |
| 8,407,948 | B1 * | 4/2013 | Nash | 52/102 |
| 8,490,359 | B2 * | 7/2013 | Perotti et al. | 52/589.1 |

\* cited by examiner

*Primary Examiner* — Basil Katcheves
*Assistant Examiner* — Joshua Ihezie
(74) *Attorney, Agent, or Firm* — Gardner, Linn, Burkhart & Flory, LLP

(57) ABSTRACT

Lawn and garden edging segments for end-to-end adjacent installation on an outdoor ground surface, with each edging segment comprising an elongate member having a pair of laterally extending arms defining separate sides of the edging segments and extending along the elongate length of the edging segments. The arms each include a lower wall, an upper wall on a top side of the edging segment and an edge wall. A lower projecting member extends outwardly from a bottom side of the edging segment between the lower walls of the arms the projecting member extending beyond planes defined by the lower walls. The edging segments are configured for installation such that the projecting members are positioned within a groove formed in the ground with the lower walls of the arms extending outwardly adjacent the groove.

14 Claims, 16 Drawing Sheets

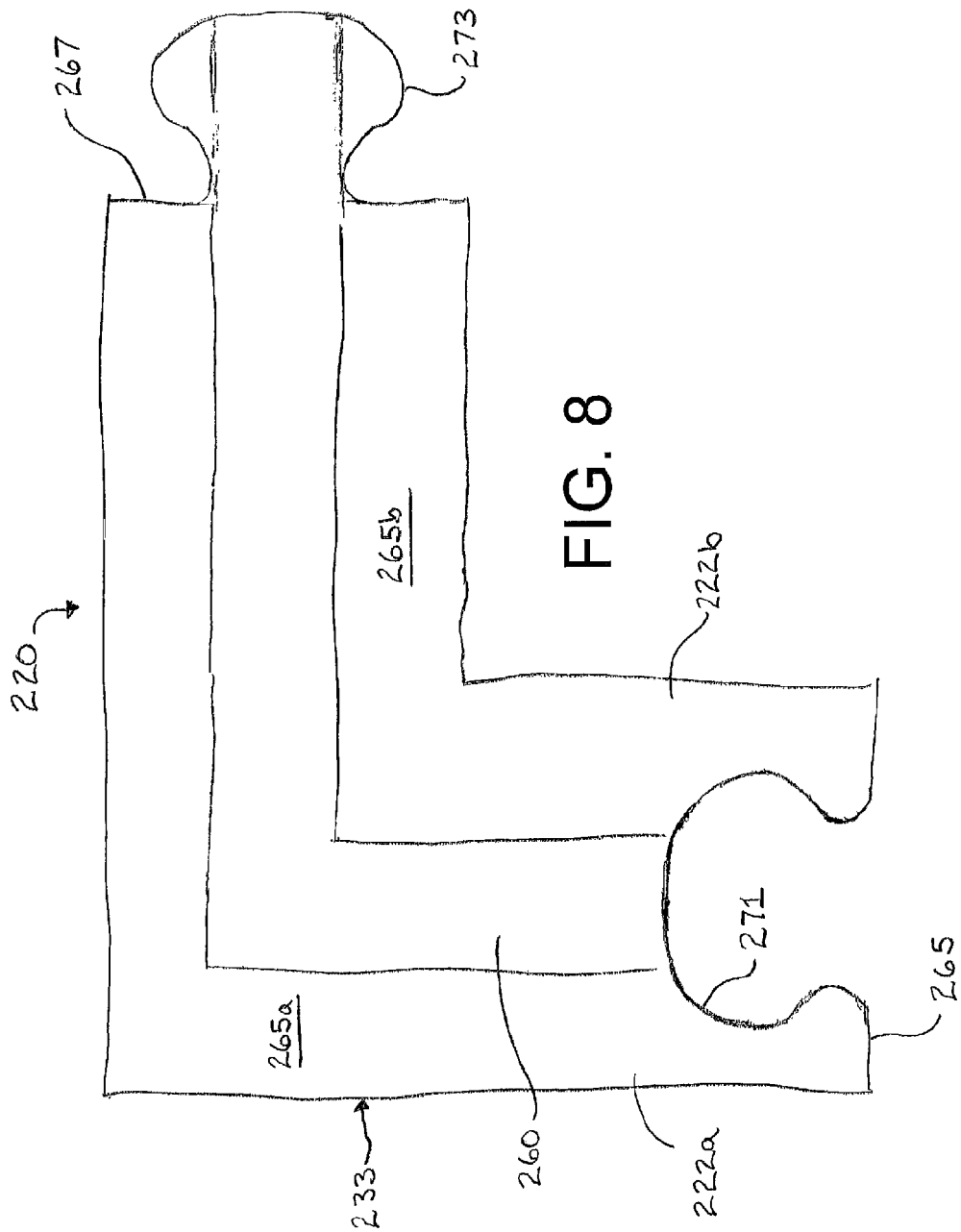

LAWN AND GARDEN EDGING

CROSS REFERENCE TO RELATED APPLICATION

The present application claims priority of U.S. provisional application, Ser. No. 61/703,839 filed Sep. 21, 2012, by Jeffery M. Beutler for LAWN AND GARDEN EDGING, which is hereby incorporated herein by reference in its entirety.

BACKGROUND OF THE INVENTION

The present invention is directed to an edging member or assembly for lawns and gardens, with the edging being used as a divider such as for lawns and gardens.

Edging is used as a divider between areas, such as between lawn or garden areas and landscaped areas in which mulch, rocks or other materials are placed for landscape design purposes. Conventional edging is constructed of metal or plastic material that forms a vertical wall and is positioned and retained by stakes and/or by the edging itself being driven into the ground. Such edging is often dislocated due to shifting in the ground, such as from freeze-thaw cycles, and/or must be readjusted. Conventional edging and the associated stakes may present a trip or other type of hazard as they project from the ground and include sharp edges or corners. In addition, due to the generally upright manner in which the edging is installed lawn mowers are not able to cut grass that is immediately adjacent the vertical wall defined by the edging such that additional lawn maintenance steps must be performed, such as trimming of the grass.

SUMMARY OF THE INVENTION

The present invention provides edging that is adapted to maintain its installed orientation and position even when the ground shifts, as well as enables grass immediately adjacent to the edging to be cut by a lawn mower, thus avoiding the need for a separate trimming operation.

According to an aspect of the present invention, an edging segment for installation on an outdoor ground surface comprises an elongate member having at least one laterally extending arm defining a side of the edging segment and extending along its elongate length, with the arm including a lower wall. The segment further includes a projecting member extending outwardly from a bottom side of the edging segment beyond a plane defined by the lower wall of the arm. When the edging segment is installed the projecting member is configured to be positioned within a groove formed in the ground with the lower wall of the arm extending outwardly adjacent the groove into which the projecting member is placed. An edging assembly for installation on an outdoor ground surface in accordance with the present invention is configured by joining multiple edging segments together in adjacent end-to-end relationship.

In particular embodiments the edging segment further includes an upper wall on a top side with the arm including an edge wall and the upper wall and lower wall being joined with the edge wall and extending inwardly from the edge wall. The edging may further include a projecting portion extending outwardly from the top side beyond a plane defined by the upper wall, with the projecting portion extending in a substantially laterally opposed orientation relative to the lower projecting member. The edging segment may further include a pair of opposed laterally extending arms with the lower projecting member and upper projecting portions being positioned between the arms.

Still further, the edging segments include ends that may be configured for complimentary overlapping engagement with adjacent edging segments. Additionally or alternatively, one end may include a locking receptacle with the other end including a locking projection for interconnecting adjacent edging segments.

In a preferred embodiment the edging segments are flexible and may be constructed from recycled tires. Edging segments may be constructed as a unitary member or alternatively may be formed from separate base members and riser members, with the base members including a receptacle for receiving riser members.

According to another aspect of the present invention, the edging segment may include a channel in a top side of the edging segment, where the channel is configured to receive a landscaping product or object, such as bricks. In a particular embodiment the channel includes a pair of side walls extending the elongate length of the edging segment, with the side walls being joined with and spaced by a base surface.

The lawn edging segments in accordance with the present invention create a separation or border for lawns and/or gardens, with the segments providing clean, distinct and durable demarcations by relying on gravity and natural adhesion between two surface areas, that being the extended surface of the lower projecting member and the ground, as well as the extending arms to the ground. Thus, the lawn edging segments of the present invention do not attempt to fight against movement caused by, for example, freeze-thaw cycles, but instead move with the ground changes that occur. Under normal conditions, the use of separate stakes, rods or other ground fixing devices can be avoided, where such devices are inevitably forced out of the ground by natural forces, thus creating additional maintenance work, damaged materials and dangerous situations for humans and pets. Moreover, the providing of a laterally extending arm, or a pair of opposed laterally extending arms, enables lawn maintenance equipment to ride up onto the lawn edging segments to cut grass adjacent the segments without requiring a separate trimming step, such as via a gas or electric powered lawn edger device.

These and other objects, advantages, purposes and features of this invention will become apparent upon review of the following specification in conjunction with the drawings.

BRIEF DESCRIPTION OF THE DRAWINGS

FIG. 8 is a top view of an alternative embodiment of edging in accordance with the present invention;

DESCRIPTION OF THE PREFERRED EMBODIMENTS

Figure 1:
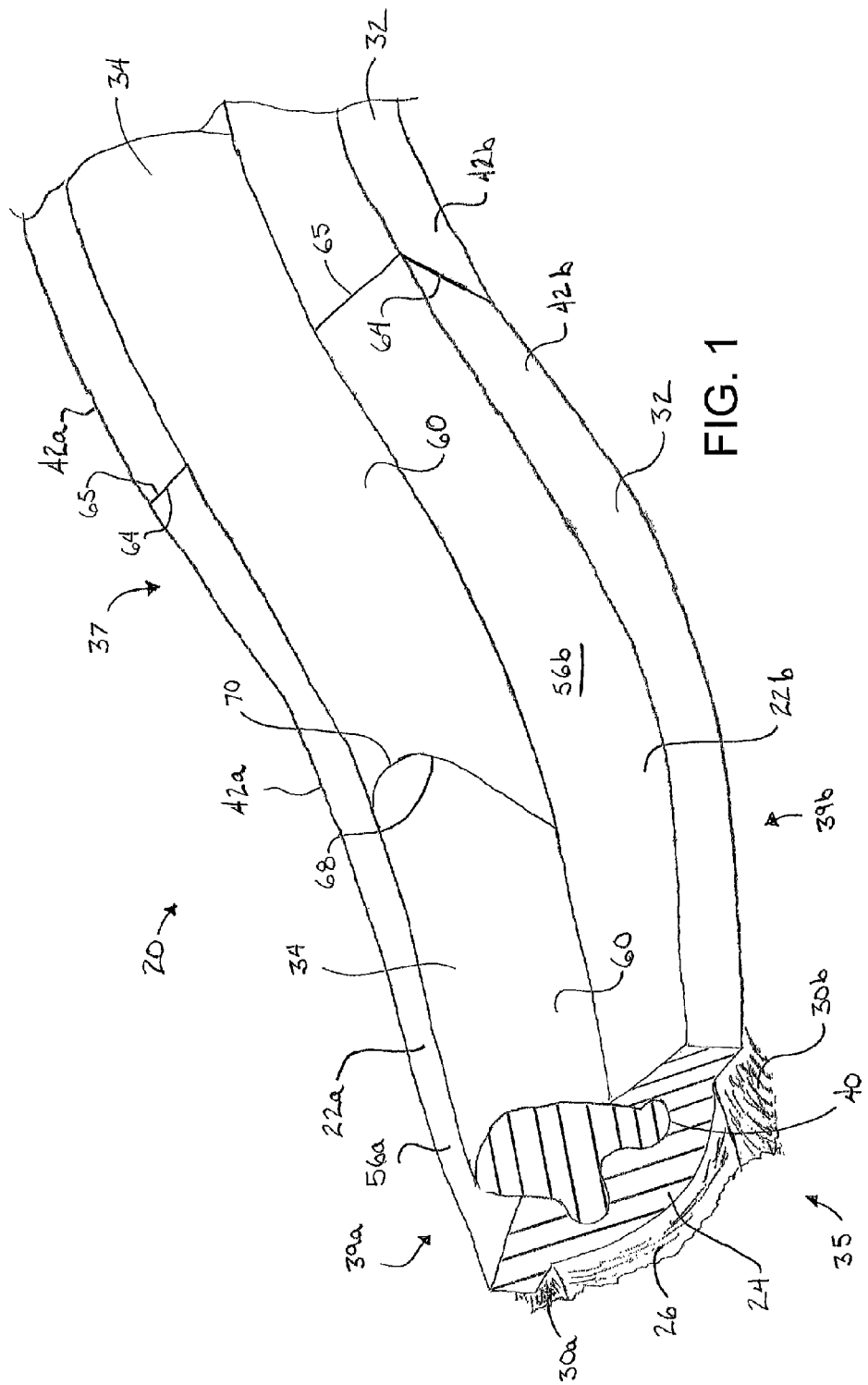
FIG. 1 is a perspective view of edging in accordance with the present invention installed with regard to a ground surface and an end shown in cross section.
Figure 2:
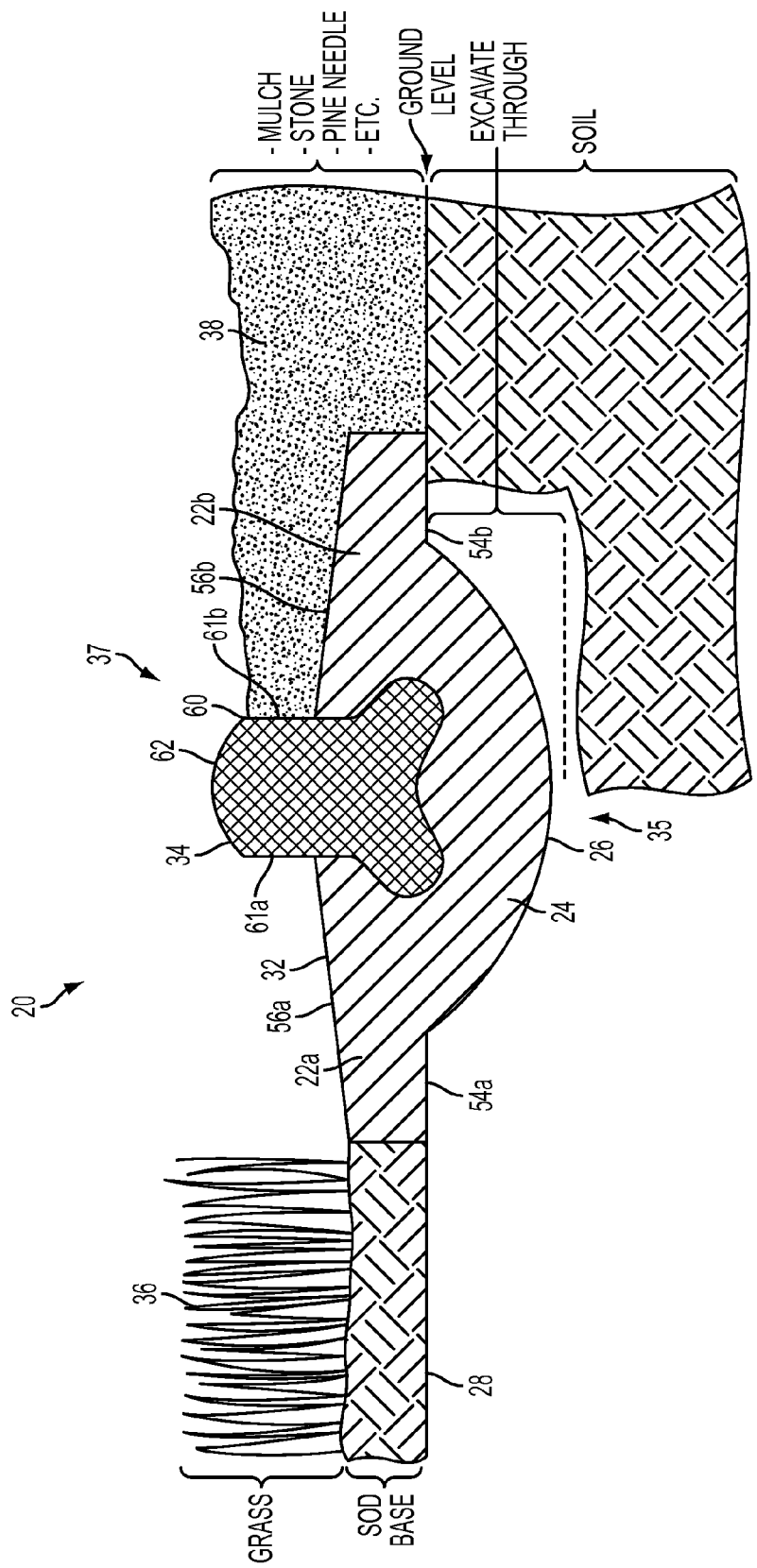
FIG. 2 is a cross-sectional end view of the edging of FIG. 1 as installed relative to the ground and shown as a divider between a lawn and landscaping materials.

The present invention will now be described with reference to the accompanying figures, wherein the numbered elements in the following written description correspond to like-numbered elements in the figures. With reference to FIGS. 1 and 2, edging 20 comprises a flexible, elongate structure or assembly having opposed outwardly extending arms or lips 22a, 22b and a downwardly extending central bottom protuberance or lower projecting member 24. Edging 20 is installed by placing bottom 24 within a trough or groove 26 formed in the ground 28 with arms 22a, 22b extending over adjacent surfaces 30a, 30b on either side of trough 26. The flexibility of edging 20 additionally aids in the positional retention of edging 20 relative to ground 28 as edging 20 is able to move or adapt to relative movement of ground 28, such as can occur during freeze-thaw cycles. Moreover, the configuration of bottom 24 and arms 22a, 22b provides increased surface contact with ground 28, thereby promoting the adhesion of edging 20 with ground 28 and aiding in the positional retention of edging 20. Still further, the weight of edging 20 also aids in its positional retention by gravitational forces acting to retain member 24 within groove 26. In one preferred form, edging 20 is constructed from recycled tires, thereby providing edging 20 with flexibility and a density to promote gravitational retention of edging 20 within groove 26.

Figure 3:
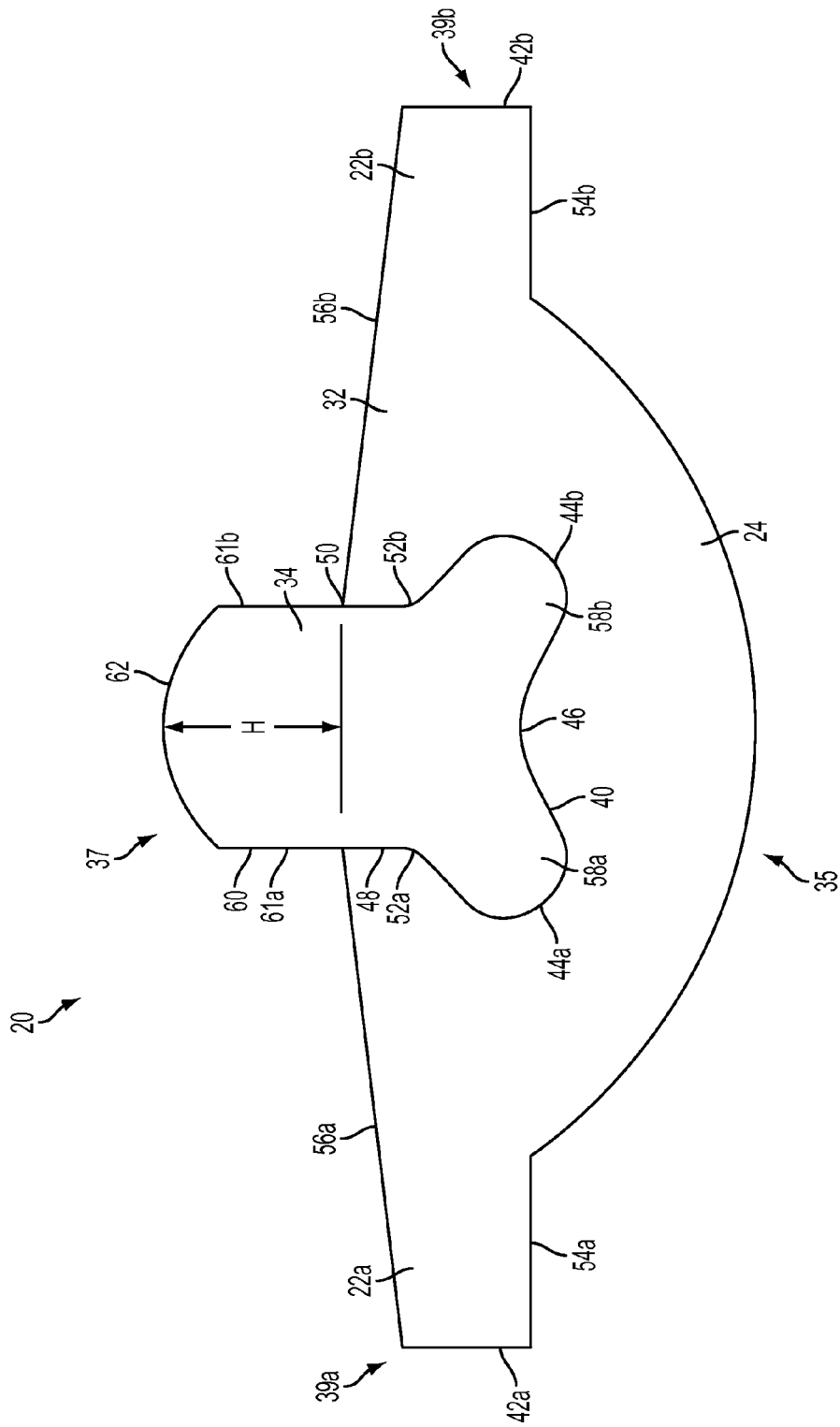
FIG. 3 is a cross-sectional end view of the edging of FIG. 1 disclosing the interconnection of the base portion with the riser portion.

In the embodiment of FIGS. 1-4, edging 20 is formed by multiple interconnected elongate members formed from base segments or members 32 and elongate riser segments or members 34 where, as understood from FIGS. 1-3 and described in more detail below, multiple base segments 32 are joined in end-to-end relationship by interlocking and overlapping connection with multiple riser segments 34 joined in end-to-end relationship. Accordingly, when so connected risers 34 project upwardly out of bases 32 with risers 34 thereby forming a barrier or divider such as, for example as shown in FIG. 2, between grass 36 and landscaping materials 38, where materials 38 may comprise mulch, stones, pine needles, or the like. As shown in FIG. 3, edging 20 includes a bottom 35 and a top 37, as well as sides 39a, 39b, defined by arms 22a, 22b, respectively, with the bottom, top and side designations being for reference purposes and are relative to installation of edging 20 as shown in FIG. 2.

Figure 4:
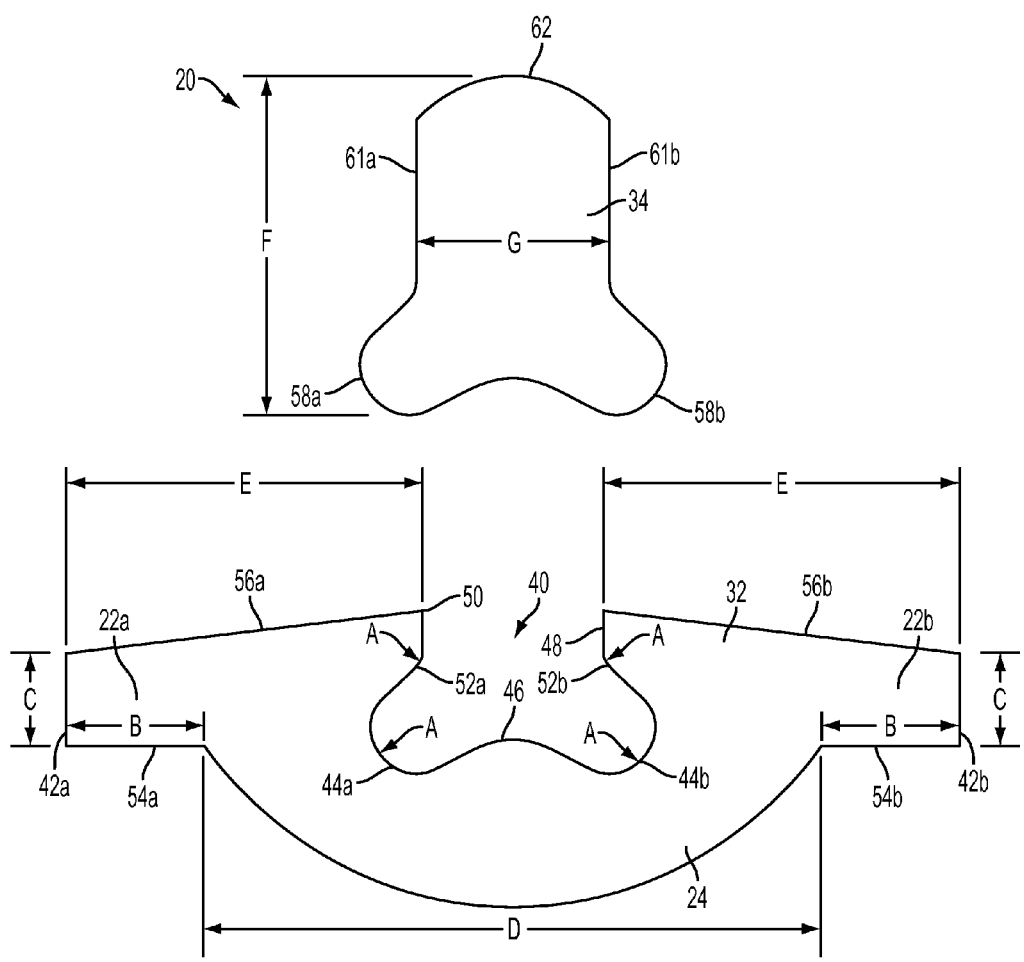
FIG. 4 is a cross-sectional exploded end view of the base portion separate from the riser portion.

Base segments 32 and riser segments 34 are flexible and may be constructed of varying lengths and/or may be cut to length during installation. Referring now to FIG. 4, each base includes an elongate receptacle 40 extending the length of base 32 for receiving risers 34, where receptacle 40 is centrally oriented relative to outer edges or walls 42a, 42b of arms 22a, 22b in the illustrated embodiment and is constructed to include a dog-bone like profile. Receptacle 40 includes a pair of opposed pockets 44a, 44b separated by a raised portion 46, with pockets 44a, 44b being located below a narrowed neck 48 forming the elongate opening 50 along the length of base 32, with neck 48 including shoulders 52a, 52b leading to pockets 44a, 44b, respectively. In the embodiment of FIG. 4, each of shoulders 52a, 52b and pockets 44a, 44b have a radius of approximately one centimeter, as understood by the reference "A" shown in FIG. 4.

Arms 22a, 22b of base 32 are defined by lower portions or walls or surfaces 54a, 54b, edges 42a, 42b, and a portion of upper walls or surfaces 56a, 56b. Lower surfaces 54a, 54b extend from edges 42a, 42b inwardly toward projecting member 24, with surfaces 54a, 54b being generally planar and generally lying in the same plane with one another in the illustrated embodiment. Also in the illustrated embodiment, each arm 22a, 22b has a width B of approximately 3 cm along the respective distance of surfaces 54a, 54b, with each edge 42a, 42b having a height C of approximately 2 cm. Lower projecting member 24 is shown to have a curved or arced profile having a radius of approximately 8.7 cm and separates arms 22a, 22b by a distance D of 14 cm. Still further, upper surfaces 54a, 54b extend from edges 42a, 42b to opening 50 a distance E of 8.0 cm with a rise of 1 cm from edges 42a, 42b to opening 50.

As shown in the side profile views of riser segments 34, risers 34 are formed to include a pair of connecting projections 58a, 58b for connecting with pockets 44a, 44b, respectively, with projections 58a, 58b having a corresponding radius A. In the illustrated embodiment, risers 34 have a height F of 7.0 cm, a width G of 4.0 cm, and include an upward projecting portion 60 that projects from base 32 out of opening 50 a distance H of 3.5 cm, as defined by walls 61a, 61b, and include an end 62 that is rounded with a radius of 2.5 cm. As with bases 32, risers 34 are also constructed to flexible such that when installed in bases 32, edging 20 may be curved from side-to-side and in an undulating manner to conform to the profile of the ground to which edging 20 is being applied. Still further, the flexible nature of bases 32 and risers 34 promote installation of risers 34 into bases 32 where one of projections 58a, 58b may be positioned into its respective mating pocket 44a, 44b with the other projections 58a or 58b then being worked into its respective pocket 44a or 44b by downward pressure on riser 34 with opening 50 having some give or play to enable installation of the riser 34 due to the flexibility of base 32.

As understood from FIG. 1, bases 32 have opposed ends 64, 66, with an end 64 of one base 32 being constructed for engagement with the end 66 of an adjacent base 32, where ends 64, 66 are angled in complimentary relation with respect to one another to provide overlapping engagement. Likewise, risers 34 have opposed ends 68, 70, with an end 68 of one riser 34 being constructed for engagement with the end 70 of an adjacent riser 34. Ends 68, 70 are also angled in complimentary relation with respect to one another to provide overlapping engagement. As also understood from FIG. 1, risers 34 may be installed to bases 32 such that adjacent riser ends 68, 70 are not aligned with adjacent base ends 64, 66. Accordingly, installation of risers 34 into bases 32 serves to interlock the risers 34 and bases 32 together.

Referring now to FIG. 2, edging 20 is shown separating grass 36 from landscaping material 38, with arms 22a, 22b disposed over ground 28 such that surfaces 54a, 54b are contacting surfaces 30a, 30b of ground 28 and projecting member 24 is positioned in and contacting ground 28 in trough 26. Projecting portion 60 acts a divider or barrier to landscaping materials 38, with landscaping materials 38 being disposed over surface 56b. Grass 36 is separated from projecting portion 60 by base 32 along the length of surface 56a, with grass 36 growing above the height of base 32. Notably, when grass 36 is being cut a wheel or wheels of a lawn mower are able to ride up on and along surface 54a. Thus, the separation between grass 36 and projection portion 60 promotes the cutting of grass 36 directly up against edging 20 without the need for additional trimming, such as by a separate trimming device. This promotes and provides a cleaner appearing lawn/edging area without the need for additional trimming, thus saving time and the expense associated with use of an additional gas or electric powered trimming device.

It should be appreciated that alternatively sized and configured bases 32 and risers 34 may be employed within the scope of the present invention. Including, for example, regarding the various dimensions discussed above, such as for the dimensions of radii, lengths, heights, and widths set forth in regard to references A-H. Moreover, an alternative edging in accordance with the present invention may be constructed such that it is not bilaterally symmetrical such as, for example, with respect to the location of an upwardly projecting portion or a lower projecting member. Still further, alternatively configured receptacles in bases 32 may be employed for receiving alternatively configured risers to provide interlocking engagement there between.

Figure 5:
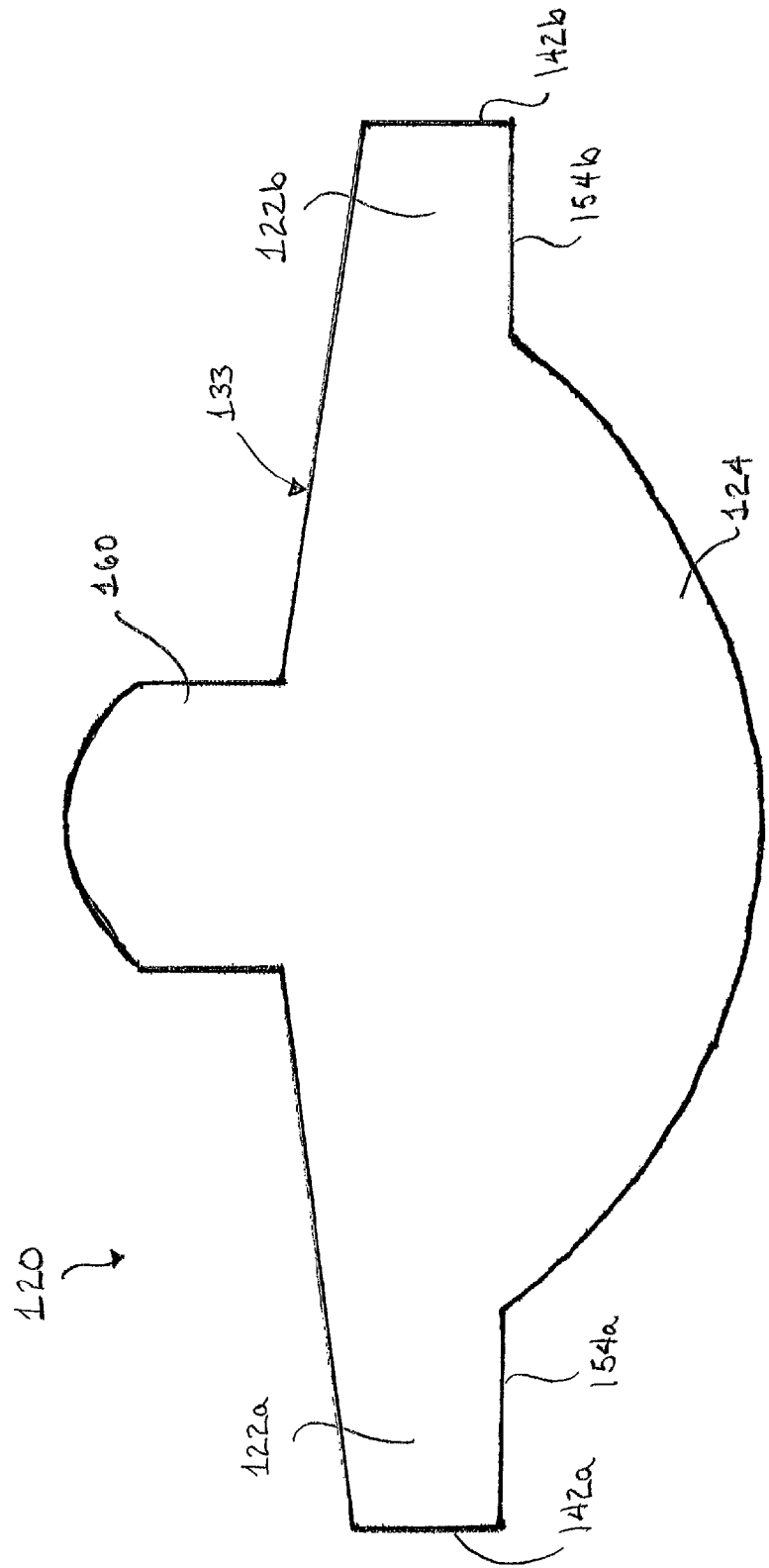
FIG. 5 is a cross-sectional end view of an alternative embodiment of edging in accordance with the present invention.
Figure 6A:
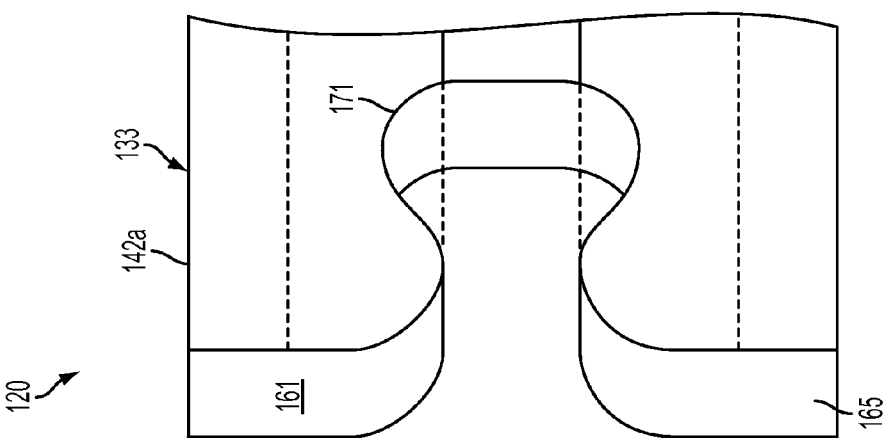
FIG. 6A is a top view of a segment of the edging of FIG. 5.
Figure 6B:
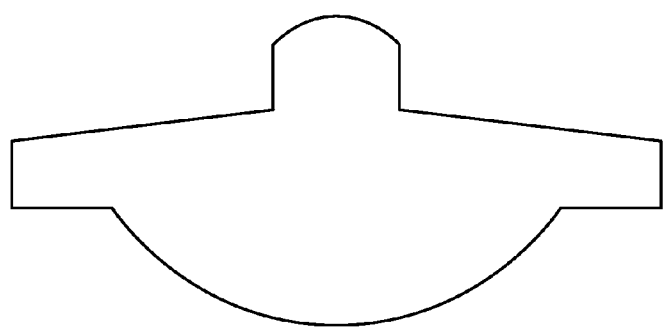
FIG. 6B is an end profile view of a segment of edging of FIG. 5 illustrating the relation to FIG. 6A.
Figure 7A:
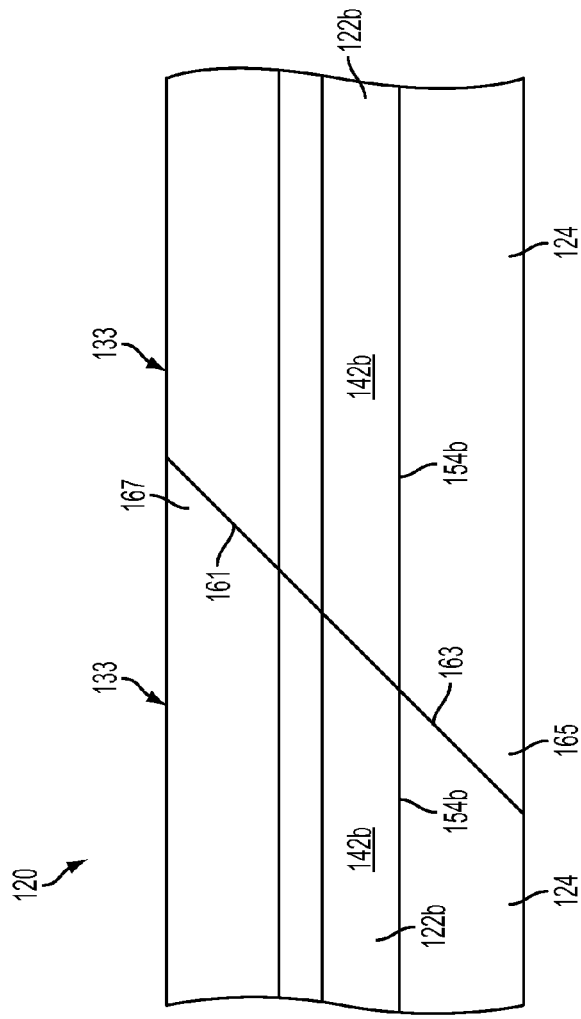
FIG. 7A is a side profile view of a pair of adjacent segments of edging of FIG. 5 shown in interlocking and interconnected engagement.
Figure 7B:
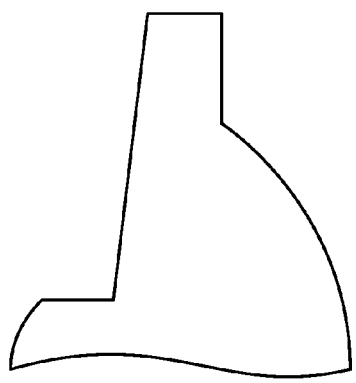
FIG. 7B is an end profile view of a segment of edging of FIG. 5 illustrating the relation to FIG. 7A.

Referring now to FIGS. 5-7, an alternative flexible edging 120 in accordance with the present invention is shown, where edging 120 is substantially similar to edging 20 discussed above. Instead of utilizing separate base members 32 and riser members 34, however, edging 120 comprises segments 133 that may be interconnected together to form edging 120. Moreover, as understood from FIG. 5, each segment 133 has a substantially similar cross-sectional profile as the cross-sectional profile of combined base members 32 and riser members 34 of edging 20 as shown in FIGS. 2 and 3.

Features of edging 120 corresponding with features of edging 20 are identified with similar reference numerals, but with 100 added to the corresponding reference numerals for edging 120. Due to the substantial similarities with edging 20, however, not all of the corresponding features of edging 120 are discussed herein. As shown, edging 120 includes a pair of laterally opposed arms 122a, 122b, a lower projecting member 124, and an upwardly projecting portion 160. Arms 122a, 122b include edges 142a, 142b as well as lower surfaces or portions 154a, 154b, respectively, that are separated by projecting member 124. Edging 120 further includes upper portions or surfaces 156a, 156b that are separated by upwardly projecting portion 160.

As understood from FIG. 7A, each segment 133 includes a pair of opposed ends 165, 167, with an end 165 of one segment 133 being constructed for engagement with the end 167 of an adjacent segment, where ends 165, 167 are angled in complimentary relation with respect to one another to provide overlapping engagement. Although ends 165, 167 are shown as angled, it should be understood that alternative end profiles may be employed for complimentary overlapping engagement.

Still further, with reference to FIG. 6A, end 165 includes an end surface or wall 161 with a locking receptacle 171 formed as cavity on end wall 161 and end 167 includes an end surface or wall 163 with a locking projection 173 extending outwardly from end wall 163. Receptacle 171 is configured to receive a projection from another segment 133, and projection 173 is configured for installation into a receptacle of yet another segment 133 for end-to-end interlocking engagement of adjacent segments 133. In the illustrated embodiment, locking receptacle 171 and locking projection 173 extend the entire cross-sectional profile height of segment 133. Accordingly, an end 165 of one segment 133 is joined with an end 167 of another segment 133 by sliding projection 173 within receptacle 171 until the projecting members 124 and projecting portions 160 of the respective segments 133 are aligned.

Although segment 133 is shown as including angled ends 165, 167 adapted for complimentary overlapping engagement with adjacent segments 133, as well as locking receptacle 171 and locking projection 173, an alternative segment 133 may be constructed to include ends for complimentary overlapping engagement or ends having a receptacle and a projection.

Referring now to FIG. 8, an alternative flexible edging 220 is shown that is substantially similar to edging 120 discussed above, with features of edging 220 being identified with similar reference numerals, but with 100 added relative to the corresponding reference numerals for edging 220. The primary difference of edging 220 relative to edging 120 is the inclusion of a bend or angle that is formed during the process of molding segment 233, with segment 233 shown to include a ninety-degree or right angle bend. Edging 220 is, therefore, well adapted for placement at corners or for forming alternative edging assemblies. While segment 233 is shown to form a right angle, it should be appreciated that alternatively angled or curved segments may also be constructed in accordance with the present invention.

Not all of the corresponding features of edging 220 are discussed herein due to the substantial similarities between edging 220 and edging 120. Edging 220 is shown, however, as comprising a segment 233 for connection with other segments, such as segments 133, where segment 233 is unitarily constructed to include a pair of laterally opposed arms 222a, 222b, a lower projecting member (not shown), and an upwardly projecting portion 260, as well as upper portions or surfaces 256a, 256b that are separated by upwardly projecting portion 260. Segment 233 further includes a locking receptacle 271 at one end 265 and a locking projection 273 at the opposite end 267 whereby segment 233 may be connected with other edging segments.

Figure 9:
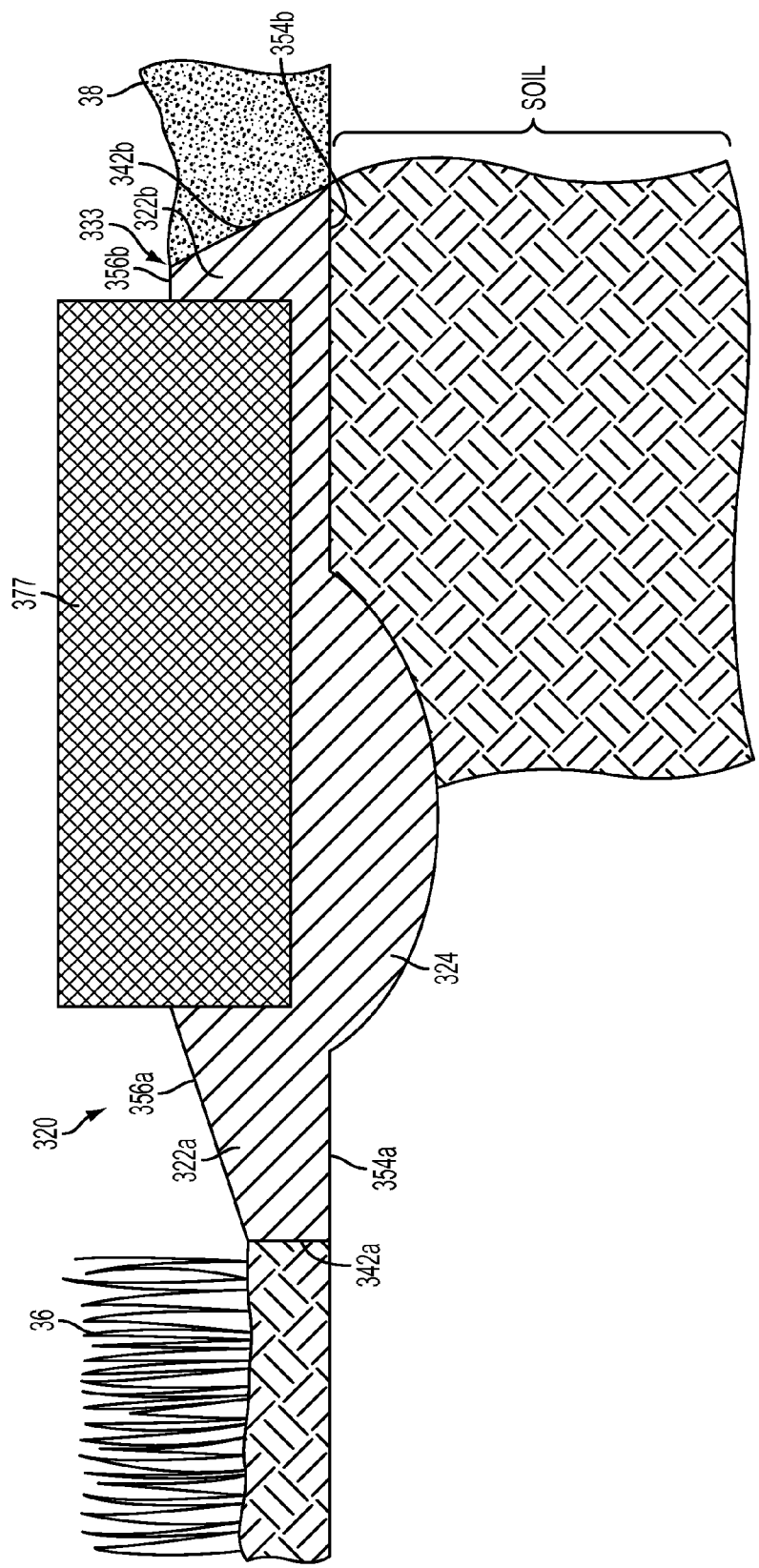
FIG. 9 is a cross-sectional end view of still another embodiment of edging in accordance with the present invention as installed relative to the ground and shown as a divider between a lawn and landscaping material.
Figure 10:
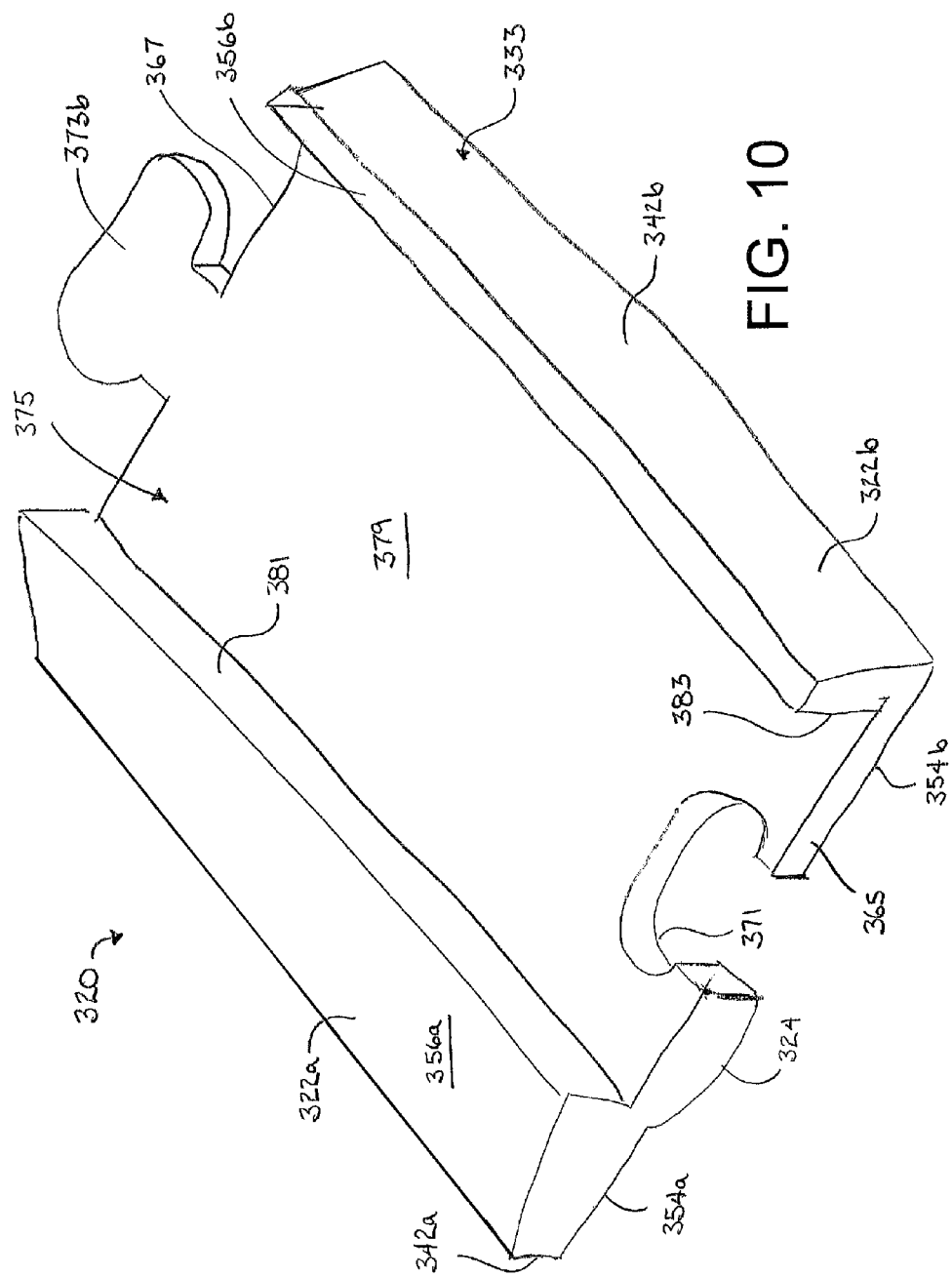
FIG. 10 is a top perspective view of a segment of the edging of FIG. 9.
Figure 11:
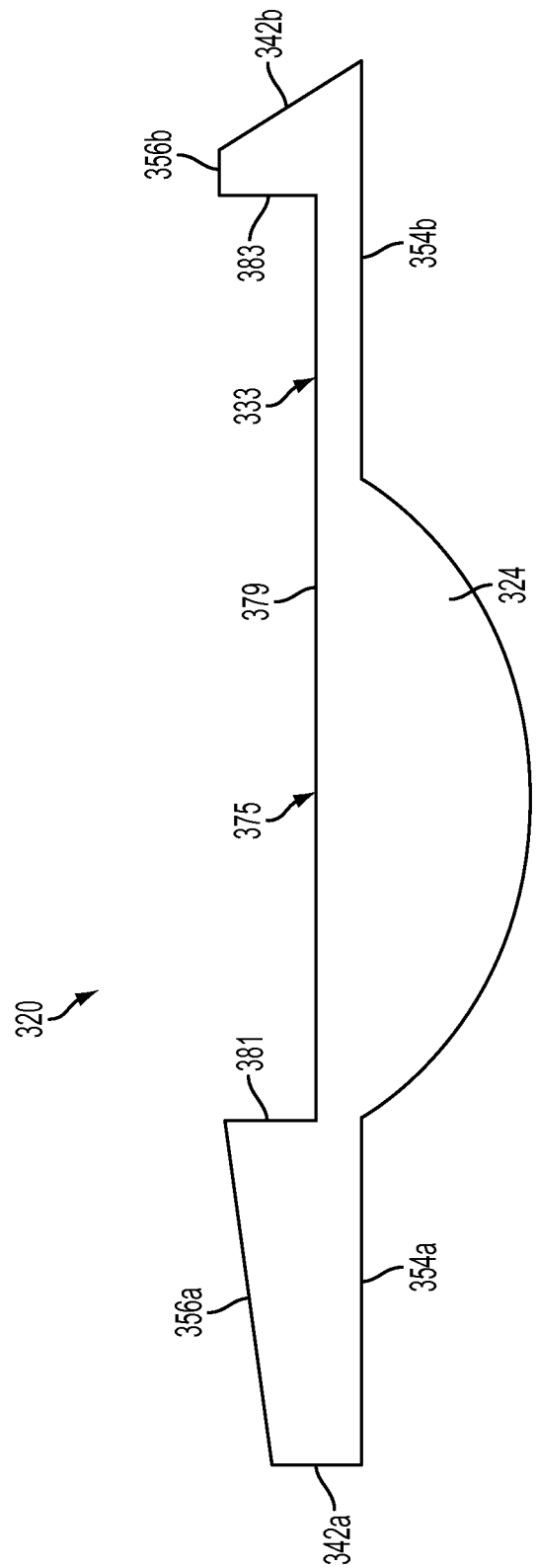
FIG. 11 is a cross-sectional end view of a segment of the edging of FIG. 9.

Referring now to FIGS. 9-11, still another flexible edging 320 is shown that is similar to the edgings discussed above, but which includes a tray or channel portion 375. Tray 375 may be used to receive landscaping products, such as bricks 377 as shown in the illustrated embodiment, accordingly, tray 375 is sized to receive bricks 377 where bricks 377 may be placed in adjacent relationship to one another to provide an alternative edging assembly appearance. Tray is defined by a lower or base surface or wall 379 and a pair of opposed side walls 381, 383 extending upward from lower wall 379. Interconnection of multiple segments of edging 320 forms a continuous tray 375, with the lower walls 379 and side walls 381, 383 of adjacent edging 320 segments.

Edging 320 shares numerous similar features to the edgings discussed above, including edging 120 such that corresponding features of edging 320 are identified with similar reference numerals, but with 200 added relative to the corresponding reference numerals for edging 320. Edging 320 comprises multiple segments 333 that may be interconnected together in end-to-end relation, with each segment including a lower projecting member 324 and a pair of outwardly opposed arms 322a, 322b. Segment 333 is not, however, bilaterally symmetrical in cross-sectional profile due to arm 322a having a different configuration relative to arm 322b in the illustrated embodiment.

Arms 322a, 322b include lower portions or surfaces 354a, 354b, respectively, as well as outer edges 342a, 342b and upper surfaces or portions 356a, 356b. As understood from FIG. 11, however, lower surface 354a has a smaller width than lower surface 354b and upper surface 356a has a greater width than upper surface 356b. As shown in FIG. 10, segment 333 further includes a locking receptacle 371 at one end 365 and a locking projection 373 at the opposite end 367, where receptacle 371 is configured to receive a projection 373 from another segment 333 and projection 373 is configured to be received in a receptacle 371 of yet another segment 333 for end-to-end interlocking engagement of adjacent segments 333.

When installed as shown in FIG. 9, both lower surfaces 354a, 354b contact the ground surface, with projecting member 324 positioned within a trough or groove in the ground. Bricks 377 thereby serve as a barrier between grass 36 and landscaping materials 38, such as bark or mulch. Still further, upper surface 356a provides a surface upon which a lawn-mower wheel or wheels may traverse thereby enabling grass 36 immediately adjacent segment 333 at edge 342a to be cut without the need for a separate trimming step.

Referring now to FIGS. 12-17, yet another alternative flexible edging 420 is shown that is substantially similar to edging 120 discussed above, but which includes alternative end configurations. Features of edging 420 corresponding with edging 120 are generally identified with similar reference numerals, but with 300 added to the corresponding reference numerals for edging 420. Due to the substantial similarities with edging 120, however, not all of the corresponding features of edging 420 are discussed herein.

Figure 12:
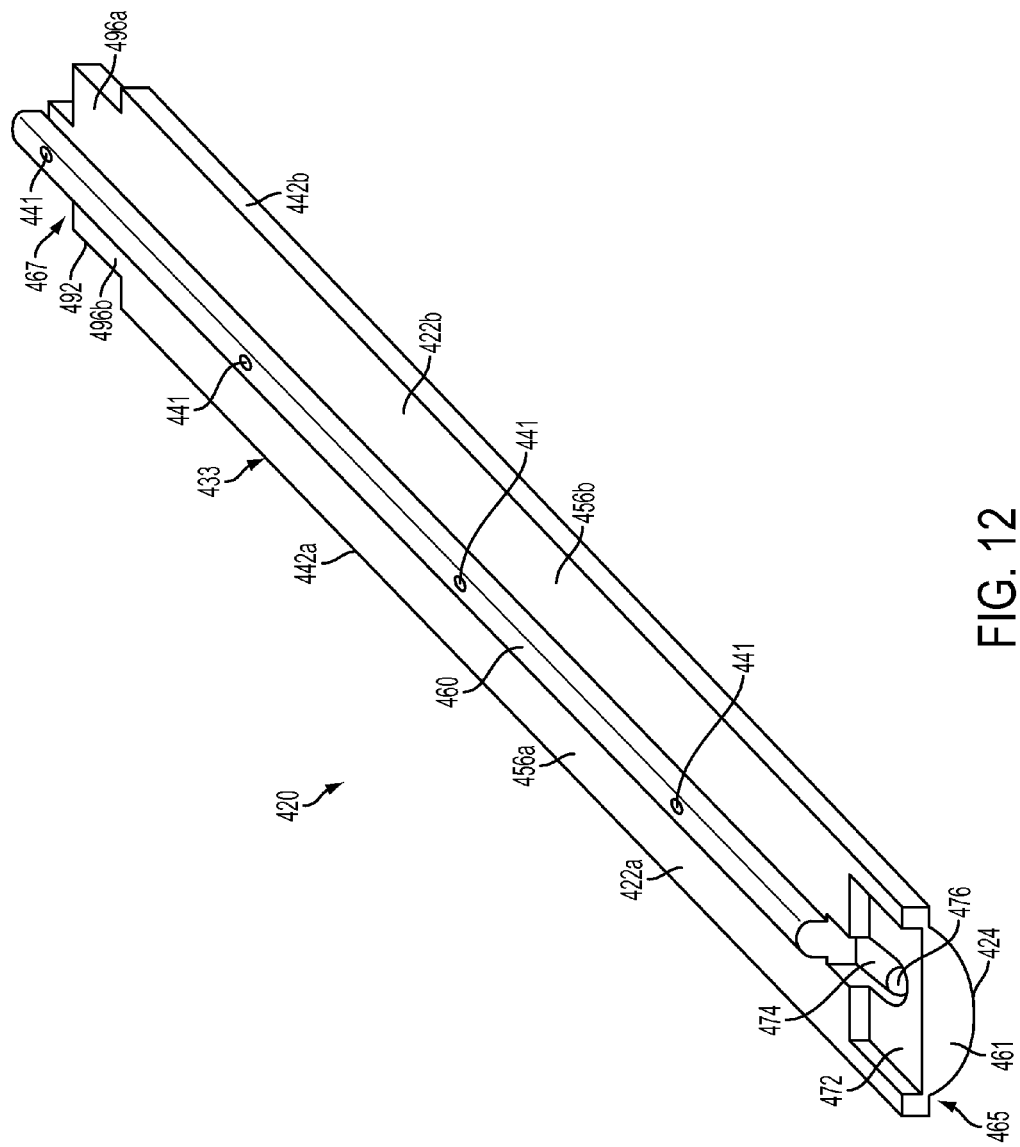
FIG. 12 is a perspective view of an alternative embodiment of edging in accordance with the present invention.
Figure 13:
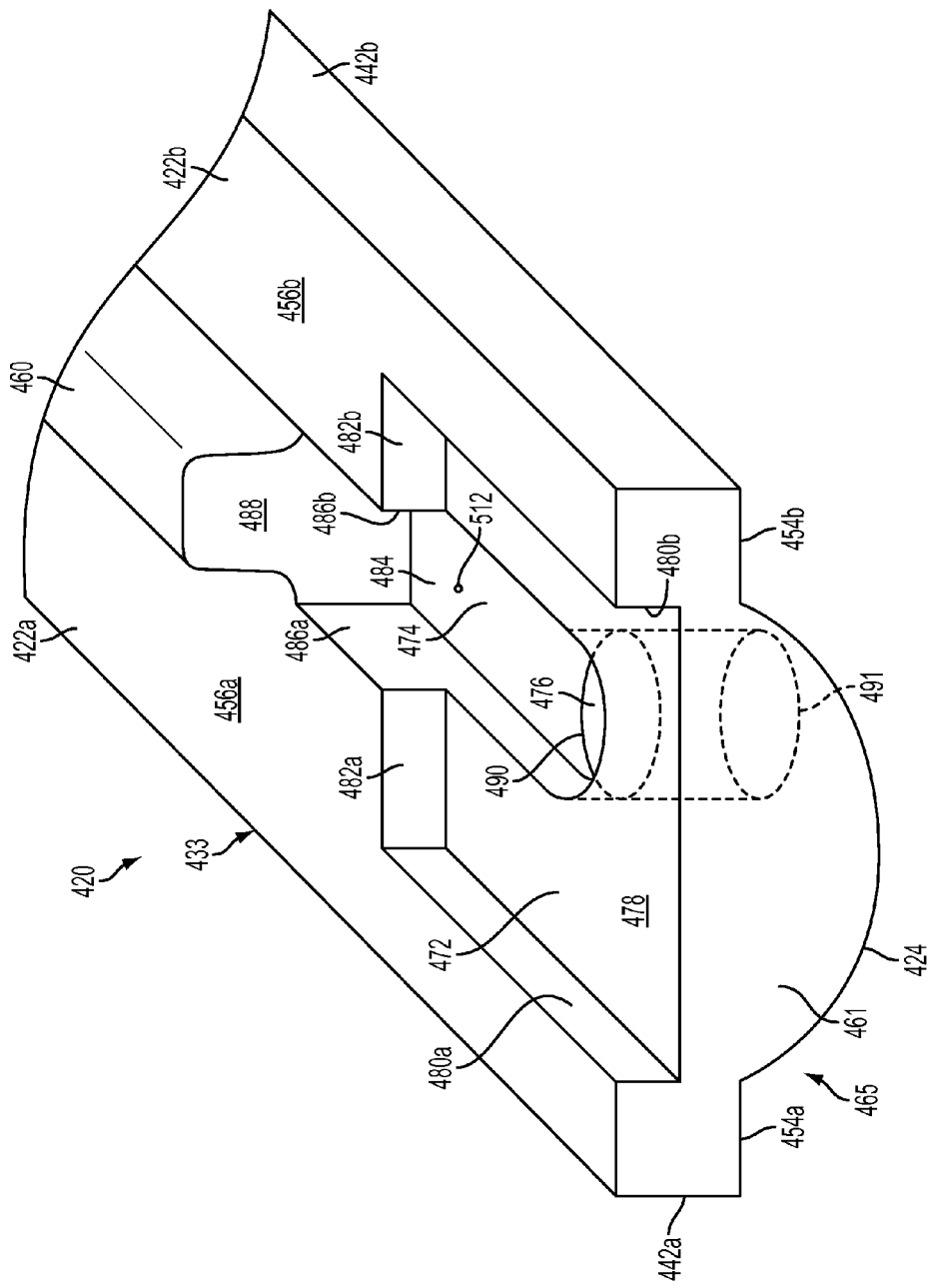
FIG. 13 is an end perspective view of the receptacle end of the edging of FIG. 12.
Figure 14:
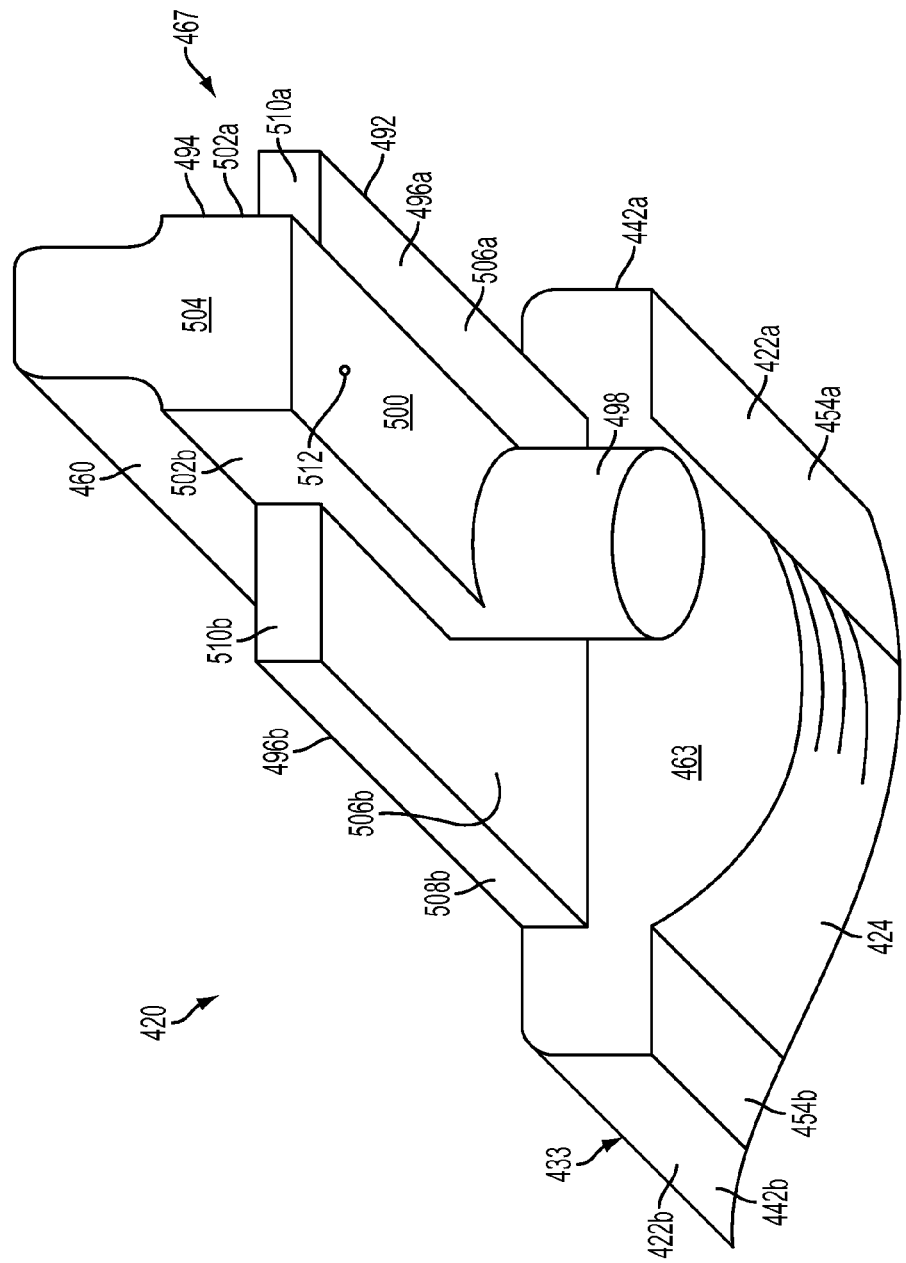
FIG. 14 is an end perspective view of the locking projection end of the edging of FIG. 12.
Figure 15:
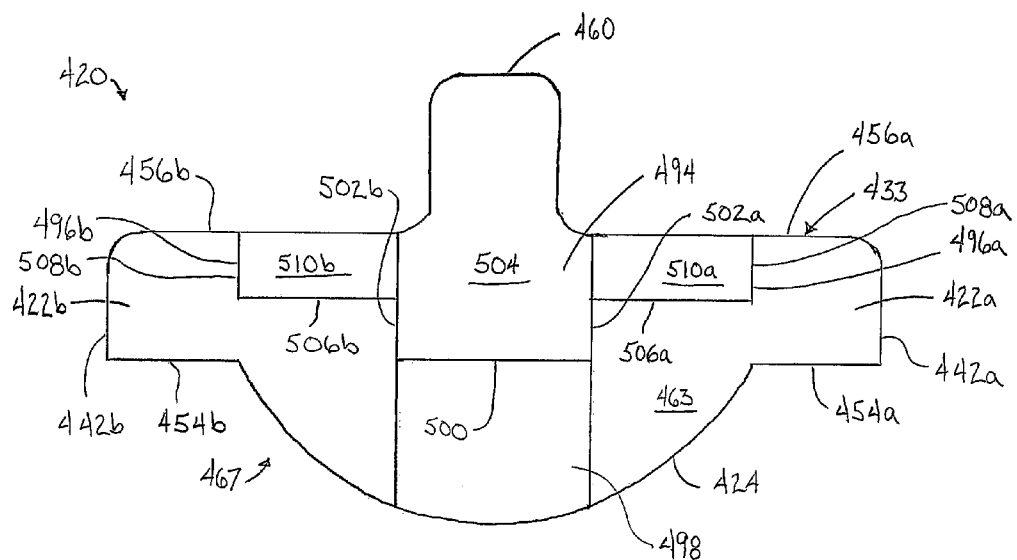
FIG. 15 is an end elevation view of the end of FIG. 14.
Figure 16:
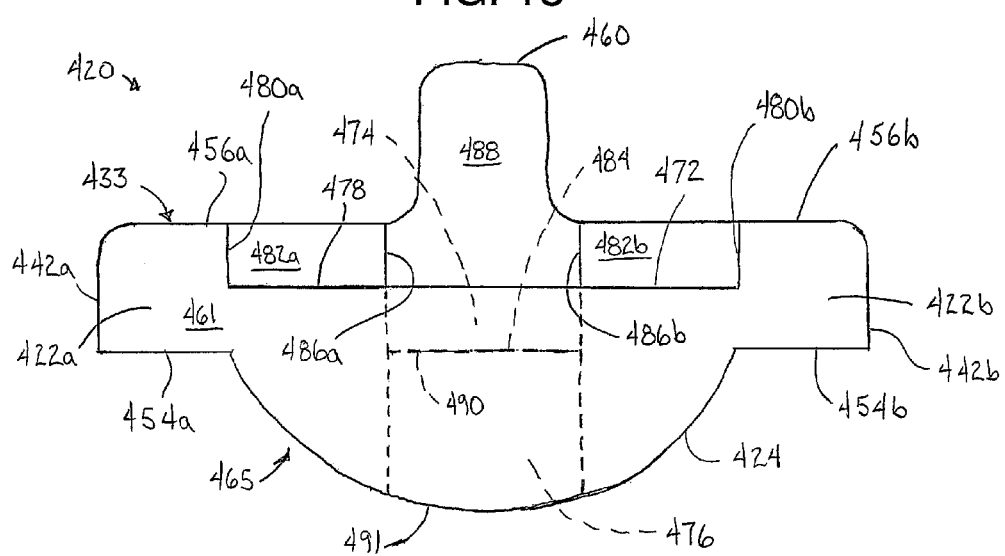
FIG. 16 is an end elevation view of the end of FIG. 13.

Edging 420 shown in FIG. 12 comprises an edging segment 433 that is connectable with additional segments 433 in end-to-end relationship for creating a desired lawn edging arrangement that can be curved or bent both side-to-side, as well as in elevation to accommodate sloping ground. In particular, edging segment 433 includes a receptacle end 465 and a locking projection end 467, where receptacle end 465 of a first segment 433 is configured to mate with the locking projection end 467 of a second segment 433 that is adjacently positioned, and locking projection end 467 is configured to mate with the receptacle end 465 of yet another segment 433. Segments 433 can be 48 inches in length, or longer or shorter, but have an elongate length that is greater than their width.

As shown, edging 420 includes a pair of laterally opposed arms 422a, 422b, a lower projecting member 424, and an upwardly projecting portion 460. Arms 422a, 422b include edges 442a, 442b as well as lower surfaces or portions 454a, 454b, respectively, that are separated by projecting member 424. Edging 420 further includes upper portions or surfaces 456a, 456b that are separated by upwardly projecting portion 460. As understood from FIGS. 15-17, lower surfaces 454a, 454b are generally planar relative to each other, and similarly upper surfaces 456a, 456b are generally planar relative to each other. In the illustrated embodiment, upwardly projecting portion 460 and downwardly projecting portion 424 are generally centrally located between edges 442a, 442b. Segment 433 may also include dimples or guides 441 along the top of projecting portion 460 for use in locating optional auger screws that may additionally be used to secure segments 433 in place.

Receptacle end 465 includes an end surface or wall 461, a first cavity, channel or receptacle 472, a second cavity, channel or receptacle 474, and a third cavity or locking receptacle 476, with cavity 474 being disposed within cavity 472 and cavity 476 in turn being disposed within cavity 474. First cavity is generally rectangular and includes a bottom or lower surface 478 that extends to wall 461 and is bounded by sidewalls 480a, 480b and end walls 482a, 482b, where walls 480a, 480b, 482a, 482b intersect with upper surfaces 456a, 456b, respectively, to define openings in arms 422a, 422b. Second cavity 474 is elongate and in turn forms an opening in bottom surface 478 and itself includes a bottom or lower surface 484 that is bounded by sidewalls 486a, 486b, and an end wall 488 formed by upward projection 460. As shown, cavity 474 is recessed inwardly relative to end wall 461, and extends axially inwardly further then end walls 482a, 482b of first cavity 472. Third cavity 476 extends in a non axial direction relative to the length of segment 433, and in the illustrated embodiment is generally cylindrical and generally perpendicular relative to the axial length of segment 433. Third cavity 476 forms an opening 490 in bottom surface 484 of second cavity 474 and extends through out of bottom lower projection member 424 to form another opening 491. In one preferred form, third cavity 476 has an hourglass form to promote engagement with a projection on end 467, as discussed below.

Locking projection end 467, includes an end surface or wall 463, with a cantilevered portion 492 extending outwardly from wall 463. Portion 492 includes a central body or member 494 that includes projection 460, with a pair of laterally extending wings or members 496a, 496b, and an extending locking projection or peg 498 extends downwardly from central body 494. Body 494 includes a lower side or surface 500, opposed sides 502a, 502b and an end or end surface 504. Each wing member 496a, 496b also includes a lower surface 506a, 506b, sides 508a, 508b, and end or end surfaces 510a, 510b. As shown, body member 494 extends axially beyond ends 510a, 510b of wings 496a, 496b.

Figure 17:
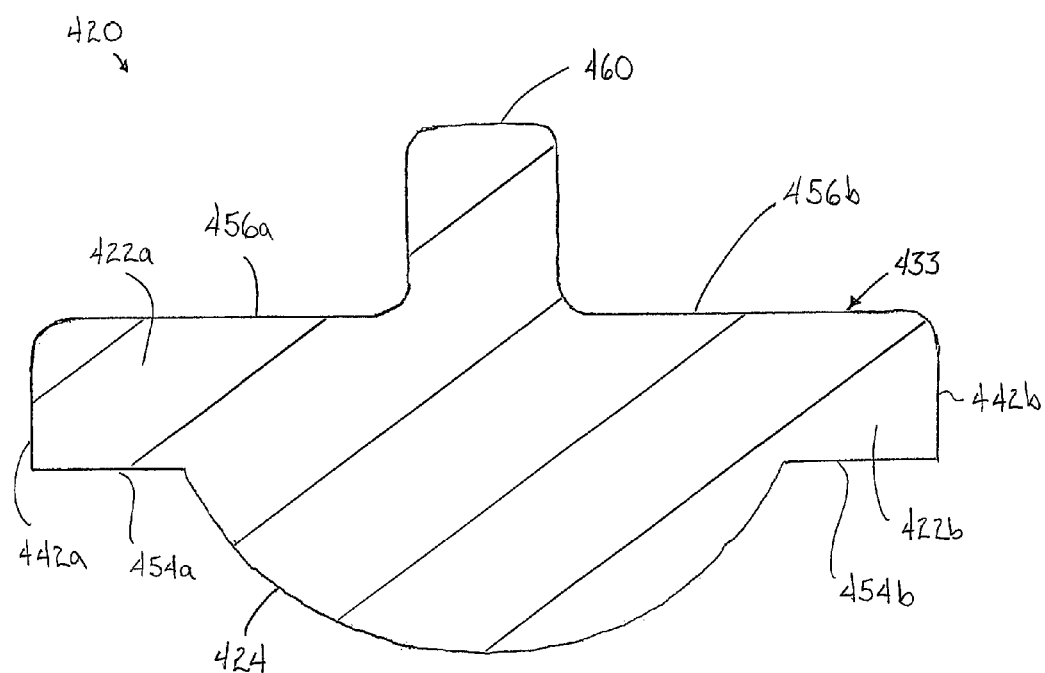
FIG. 17 is a cross sectional view of the edging of FIG. 12.

With reference to the cross section of edging 420 in FIG. 17, lower projecting member 424 is curved to be generally semicircular, in like manner to projecting member 124 of edging 120, with in the illustrated embodiment a radius of approximately 2.25 inches. Lower surfaces 454a, 454b each extend outwardly from projecting member 124 approximately one inch, with arms 422a, 422b having a height of approximately one inch at edges 442a, 442b to define the platforms upon which a lawn mower may ride or mulch or the like may be placed. Still further, upward projecting member 460 has a height of approximately 1.25 inches and a width of approximately one inch.

In the illustrated embodiment, when a receptacle end 465 is joined with a locking projection end 467, lateral wings 496a, 496b are configured to be received within first cavity 472, with the tops of lateral wings 496a, 496b then being substantially coplanar with the upper surfaces 456a, 456b of arms 422a, 422b, respectively. Still further, projection 498 in one preferred form has a generally hourglass shape for mating with receptacle 476, with surface 500 mating with bottom surface 484 of second cavity 474 and sides 502a, 502b of body 494 correspondingly mating with equivalently shaped walls 486a, 486b of cavity 474. Optionally, an auger screw may be run through the body portion 494 into and through second cavity 474 of adjacently connected segments 433, such as at location 512.

As noted in regard to the above embodiments, edging in accordance with the above discussed embodiments is constructed to be flexible, and may be constructed from recycled tires, with the edging being molded from processed rubber material obtained from the recycled tires. The density and relative flexibility of the edging may be controlled, in part, by the pressure and molding time used in forming the various segments. Edging in accordance with the present invention, such as edging 20, 120, 220, 320 or 420, thereby provides an effect barrier for lawn and garden applications, such as between grass and landscaping materials. The bottom surface areas provided by the outwardly opposed arms and bottom projecting member in conjunction with the placement of the bottom projecting member into a trough or groove in the ground promote the retention of the edging relative to the ground, with the flexibility of the edging enabling it to remain in place even in the event of relative movement of the ground. Still further, the providing of an upward facing surface on the edging enables a wheel or wheels of a lawn more to ride up and onto the surface without damaging the edging and enabling grass to be cut immediately adjacent the edging, thereby avoiding an additional trimming step.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. An edging segment for installation on an outdoor ground surface, said edging segment comprising:
    a flexible rubberized elongate member having a laterally extending arm, said arm defining a side of said edging segment and extending along the elongate length of said edging segment, said arm including a generally planar lower wall;
    a projecting member unitarily formed with said arm, said projecting member extending outwardly from a bottom side of said edging segment with said projecting member extending beyond a plane defined by said lower wall and with said lower wall extending laterally inwardly and terminating at said projecting member, and wherein said projecting member extends along the elongate length of said edging segment and has a semicircular profile; and
    a generally planar upper wall on a top side of said elongate member with said arm including an edge wall, said upper wall and said lower wall being joined with said edge wall and extending laterally inward from said edge wall;
    wherein said elongate member has a first end and a second end with said first end being distally located from said second end, said first end including a generally vertically extending locking projection having a substantially cylindrical shape and said second end including a generally vertically oriented locking receptacle defining a substantially cylindrical opening, and wherein said locking projection is adapted to be received in a locking receptacle of another edging segment and said locking receptacle is adapted to receive a locking projection of yet another edging segment such that said upper wall and said lower wall are in planar alignment with upper walls and lower walls of adjacent edging segments;
    whereby when said edging segment is installed said projecting member is configured to be positioned within a groove formed in the ground with said lower wall of said arm extending outwardly adjacent the groove into which said projecting member is placed;
    wherein said first end includes an end wall and a cantilevered portion extending generally horizontally from said end wall with said locking projection extending from said cantilevered portion, wherein said cantilevered portion is narrower than the width of said edging segment at said end wall, and wherein said second end includes a generally horizontally oriented cavity with said locking receptacle being disposed in said cavity, wherein said cavity is narrower than the width of said edging segment and defines an opening on an end wall of said second end, and wherein said cantilevered portion is configured to be received in a cavity of another edging segment and said cavity is adapted to receive a cantilevered portion of yet another edging segment.

2. The edging segment of claim 1 further including a projecting portion extending outwardly from said top side with said projecting portion extending beyond a plane defined by said upper wall, said projecting portion extending in a substantially opposed orientation relative to said projecting member.

3. The edging segment of claim 2, wherein said arm comprises a pair of opposed laterally extending arms and wherein said upper wall comprises a pair of generally planar upper walls with said projecting portion positioned between said upper walls and extending outwardly form said top side beyond planes defined by said upper walls.

4. The edging segment of claim 1, wherein said arm comprises a pair of opposed laterally extending arms with each said arm defining a separate side extending along the elongate length of said edging segment and with said projecting member being positioned between said arms, and wherein both said arms include a generally planar lower wall and said projecting member extends outwardly beyond planes defined by said lower walls, with both said lower walls extending laterally inwardly and terminating at said projecting member.

5. The edging segment of claim 4, wherein said lower walls are substantially planar with respect to one another.

6. The edging segment of claim 1, wherein said cantilevered portion includes a downwardly projecting body portion, wherein said locking projection extends downwardly from said body portion, and wherein said second end includes a channel disposed within said cavity, wherein said channel extends axially with respect to the elongate length of said edging segment, and wherein said body portion is adapted to be received in a channel of another edging segment and said channel is adapted to receive a body portion of yet another edging segment.

7. The edging segment of claim 6 wherein said body portion extends axially further beyond an end of said cantilevered portion.

8. The edging segment of claim 1 wherein said elongate member is molded to have a non-linear shape.

9. An edging segment for installation on an outdoor ground surface, said edging segment comprising:
    a flexible rubberized elongate member having a pair of laterally extending arms, said arms defining separate sides of said edging segment and extending along the elongate length of said edging segment, said arms each including a generally planar lower wall, a generally planar upper wall on a top side of said edging segment and an edge wall, with each said edge wall extending between and joining a respective said upper wall and said lower wall;
    a lower projecting member unitarily formed with said arms, said projecting member extending outwardly from a bottom side of said edging segment between said lower walls of said arms with said projecting member extending beyond planes defined by said lower walls, and with said lower walls extending laterally inwardly and terminating at said projecting member, wherein said lower walls each have a width defined between their respective edge walls and said projecting member, and wherein said projecting member extends along the elongate length of said edging segment and has a semicircular profile, with said lower walls being laterally spaced from each other by said projecting member a distance that is greater than the combined widths of said lower walls;

whereby when said edging segment is installed said projecting member is configured to be positioned within a groove formed in the ground with said lower walls of said arms extending outwardly adjacent the groove into which said projecting member is placed;

wherein said elongate member has a first end and a second end with said first end being distally located from said second end, said first end including a generally vertically extending locking projection having a substantially cylindrical shape and said second end including a generally vertically oriented locking receptacle defining a substantially cylindrical opening, and wherein said locking projection is adapted to be received in a locking receptacle of another edging segment and said locking receptacle is adapted to receive a locking projection of yet another edging segment such that said upper walls and said lower walls are in planar alignment with upper walls and lower walls of adjacent edging segments; and wherein said first end includes an end wall and a cantilevered portion extending generally horizontally from said end wall with said locking projection extending from said cantilevered portion, wherein said cantilevered portion is narrower than the width of said edging segment at said end wall, and wherein said second end includes a generally horizontally oriented cavity with said locking receptacle being disposed in said cavity, wherein said cavity is narrower than the width of said edging segment and defines an opening on an end wall of said second end, and wherein said cantilevered portion is configured to be received in a cavity of another edging segment and said cavity is adapted to receive a cantilevered portion of yet another edging segment.

10. The edging segment of claim 9 further including a projecting portion extending outwardly from said top side and positioned between said upper walls with said projecting portion being formed unitarily with said projecting member and said arms and extending upwardly beyond planes defined by said upper walls, and with said projecting portion extending in a substantially opposite orientation relative to said projecting member.

11. The edging segment of claim 9, wherein said lower walls are laterally spaced from each other by said projecting member a distance that is greater than twice the combined widths of said lower walls.

12. A plurality of edging segments for end-to-end adjacent installation on an outdoor ground surface with each said edging segment comprising:

a flexible rubberized elongate member having a laterally extending arm, said arm defining a side of said edging segment and extending along the elongate length of said edging segment, said arm including a generally planar lower wall, a generally planar upper wall on a top side of said edging segment, and an edge wall, with said upper wall and said lower wall being joined with said edge wall;

a lower projecting member unitarily formed with said arm, said projecting member extending outwardly from a bottom side of said edging segment with said projecting member extending beyond a plane defined by said lower wall and with said lower wall extending laterally inwardly and terminating at said projecting member, and wherein said projecting member extends along the elongate length of said edging segment and has a semicircular profile;

a projecting portion extending outwardly from said top side with said projecting portion being unitarily formed with said projecting member and said arm and extending beyond a plane defined by said upper wall, said projecting portion extending in an opposite orientation relative to said lower projecting member; and a first end and a second end with said first end being distally located from said second end, said first end including a generally vertically extending locking projection having a substantially cylindrical shape and said second end including a generally vertically oriented locking receptacle defining a substantially cylindrical opening;

wherein said extending locking projection of each said edging segment is adapted to be received in said locking receptacle of an adjacent said edging segment for interconnection of adjacent said edging segments whereby when said edging segments are interconnected and installed said lower projecting members are configured to be positioned within a groove formed in the ground with said lower walls of said arms extending outwardly adjacent the groove into which said projecting members are placed;

wherein each said first end includes an end wall and a cantilevered portion extending generally horizontally from said end wall with said locking projection extending from said cantilevered portion, wherein said cantilevered portion is narrower than the width of said edging segment at said end wall, and wherein each said second end includes a generally horizontally oriented cavity with said locking receptacle being disposed in said cavity, wherein said cavity is narrower than the width of said edging segment and defines an opening on an end wall of said second end, and wherein said cantilevered portion of each said edging segment is configured to be received in said cavity of an adjacent said edging segment for interconnection of adjacent said edging segments.

13. The edging segments of claim 12, wherein said laterally extending arm of each said segment comprises a pair of laterally extending arms with each said arm defining a separate side extending along the elongate length of said edging segment, and wherein both said arms include a generally planar lower wall and a generally planar upper wall and said lower projecting member is positioned between said arms and extends outwardly beyond planes defined by said lower walls, and wherein said projecting portion extends upwardly between planes defined by said upper walls.

14. The edging segments of claim 12, wherein each said cantilevered portion includes a downwardly projecting body portion, wherein said locking portion extends downwardly from said body portion, and wherein each said second end includes a channel disposed within said cavity, wherein said channel extends axially with respect to the elongate length of said edging segment, and wherein said body portion of each said edging segment is adapted to be received in said channel of an adjacent said edging segment.

* * * * *